Feb. 8, 1966  W. C. REDDEN  3,233,721
AUTOMATIC UNLOADING CONVEYOR ASSEMBLY
Filed June 22, 1964  3 Sheets-Sheet 1

INVENTOR.
Warren Clark Redden
BY
Hovey, Schmidt, Johnson & Hovey,
ATTORNEYS.

Feb. 8, 1966    W. C. REDDEN    3,233,721
AUTOMATIC UNLOADING CONVEYOR ASSEMBLY
Filed June 22, 1964    3 Sheets-Sheet 2
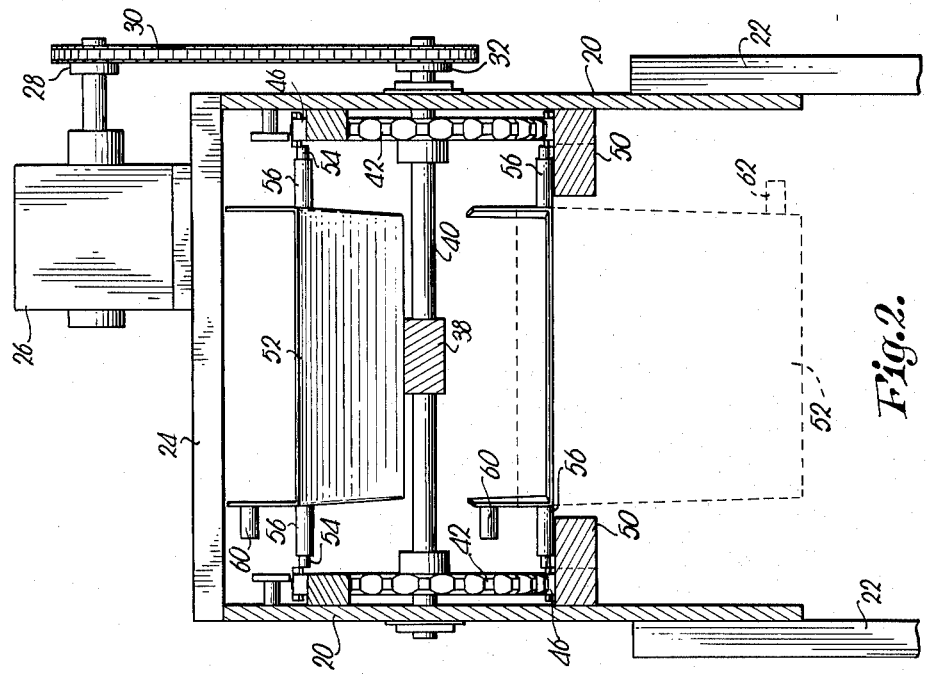
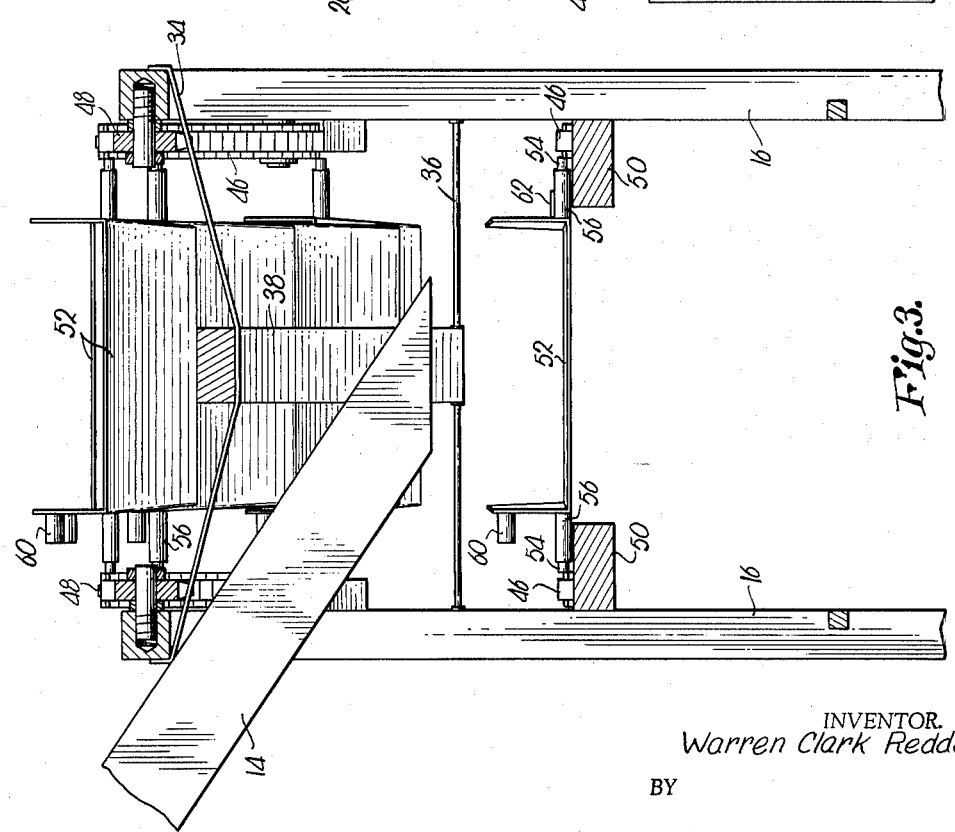
INVENTOR.
Warren Clark Redden
BY
ATTORNEYS.

Feb. 8, 1966 W. C. REDDEN 3,233,721
AUTOMATIC UNLOADING CONVEYOR ASSEMBLY
Filed June 22, 1964 3 Sheets-Sheet 3
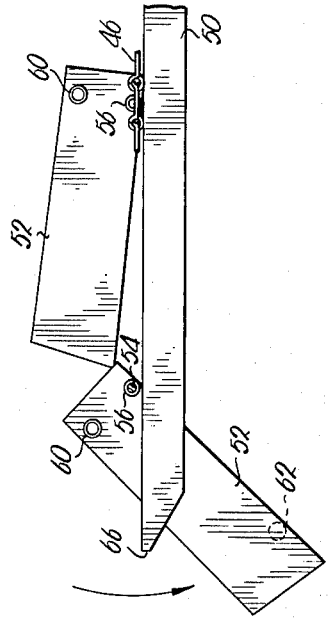
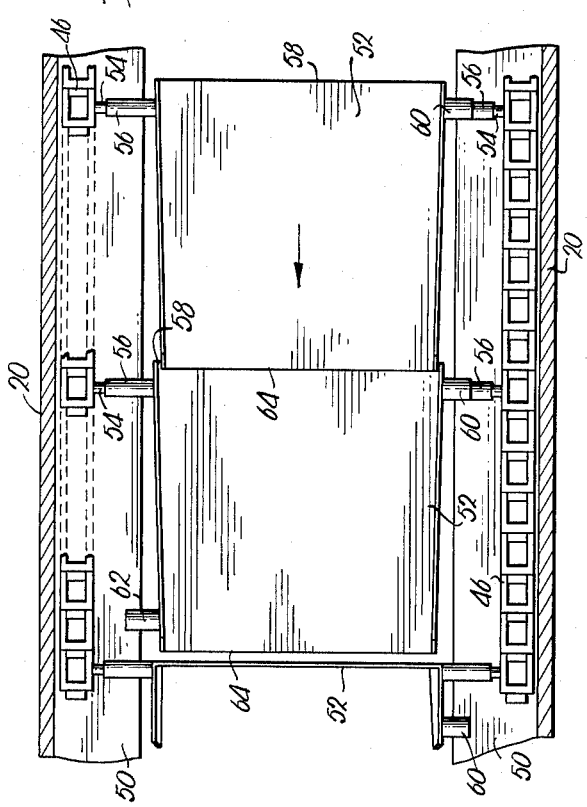
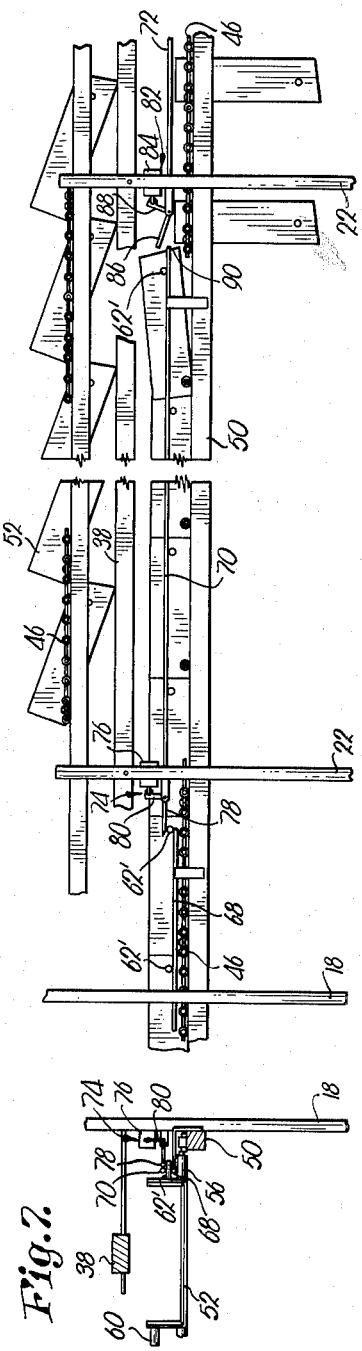
INVENTOR.
Warren Clark Redden
BY
Hovey, Schmidt, Johnson & Hovey
ATTORNEYS.

United States Patent Office 3,233,721
Patented Feb. 8, 1966

3,233,721
AUTOMATIC UNLOADING CONVEYOR ASSEMBLY
Warren Clark Redden, R.F.D., Gypsum, Kans.
Filed June 22, 1964, Ser. No. 376,955
12 Claims. (Cl. 198—145)

This invention relates generally to conveyor apparatus for transporting and unloading materials and, more specifically, to apparatus particularly adapted for distributing livestock feed from a silo or grain bulk bin to a feed trough.

It is the primary object of this invention to provide apparatus for distributing livestock feed or other materials having a higher level of efficiency than is usually found in auger-type distributing mechanisms. Since it is necessary for an auger to drag or churn through the material to be distributed, a relatively high power requirement is inherent in a device of this type and the problem of contamination, in the case of livestock feeds, may exist because of the presence of lubricants.

It is another important object of this invention to provide livestock feed distributing apparatus which will load the feed trough or bunk in a manner to prevent crowding of the livestock and "hogging" of the feed by boss animals.

Still another important object of the instant invention is to provide apparatus capable of distributing all types of chopped feeds or grains including silage, hay and hay wafers without damage and without separating mixed feeds during distribution.

Yet another important object of this invention is to provide feed distribution apparatus which minimizes blowing of the feed in high winds during distribution thereof.

A further object of the instant invention is to provide conveyor apparatus adaptable for operation by automatic, timed control mechanism. The purposes of such control and the particular utility of such an arrangement in livestock feeding operations will become more apparent as the apparatus is described in detail hereinafter.

In the drawings:

FIG. 2 is a sectional view taken along line 2—2 of FIG. 1;

FIG. 3 is a sectional view taken along line 3—3 of FIG. 1;

FIG. 4 is an enlarged, fragmentary, horizontal sectional view showing the tray structures of the instant invention in detail;

FIG. 5 is an enlarged, fragmentary, side elevational view illustrating two of the tray structures of the instant invention during the dumping operation;

FIG. 6 is a fragmentary, side elevational view of a modified form of the instant invention; and FIG. 7 is a fragmentary, end elevational view of the apparatus shown in FIG. 6.

Figure 1:
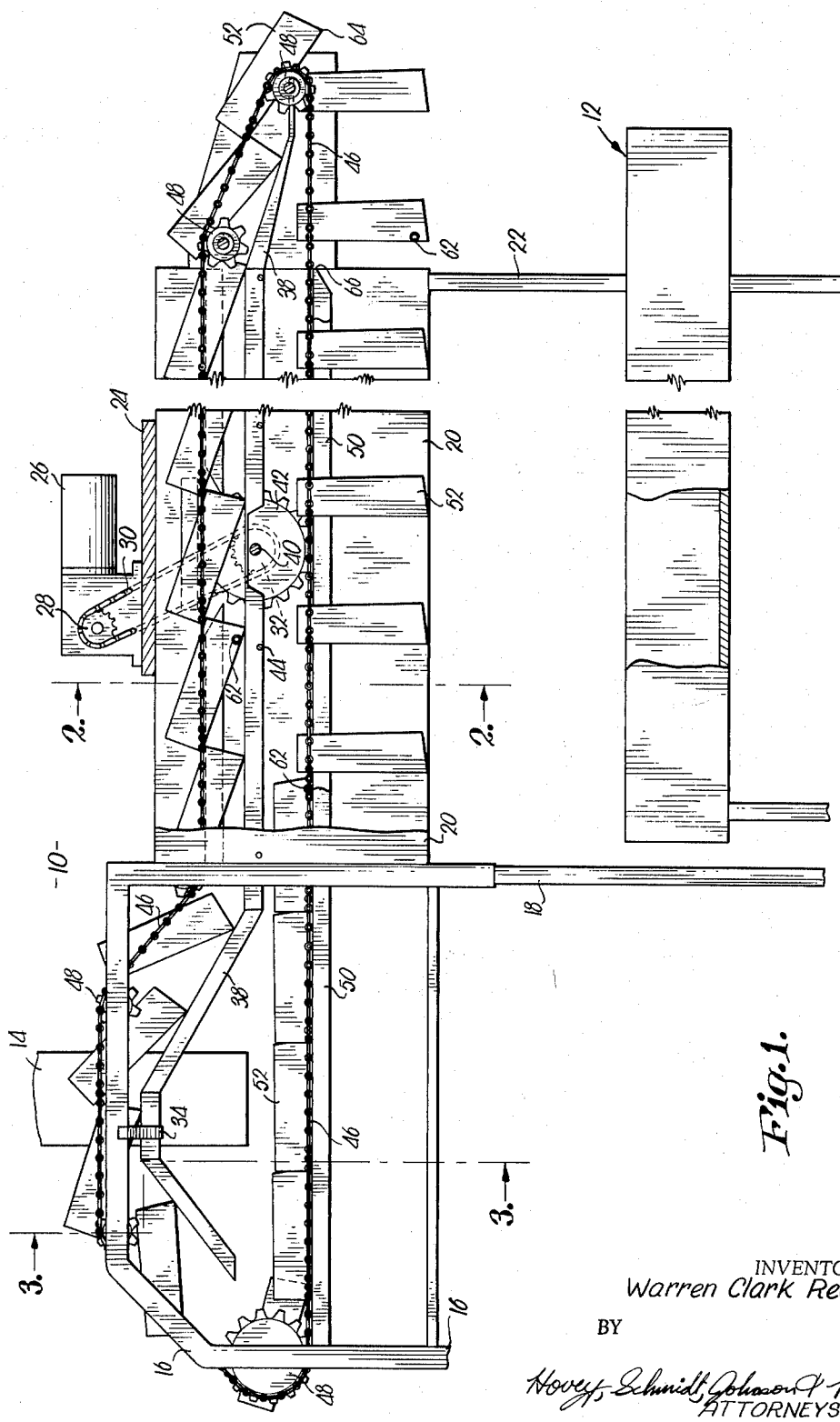
FIGURE 1 is a side elevational view of the apparatus of the instant invention, certain parts thereof being broken away or revealed in section for clarity.

The upper portion of FIG. 1 shows an assembly 10 comprising the apparatus of the instant invention disposed in operational relationship to a feed trough or bunk 12. A loading spout 14 is illustrated in association with assembly 10, it being understood that spout 14 may lead directly from a silo or grain bin or be associated with a loading and mixing auger.

In FIGS. 1–3, a pair of juxtaposed, generally rectangular frames 16 is shown supported by vertical standards 18. Rectangular frames 16 define the loading area of the apparatus. Forwardly of this area, to the right as viewed in FIG. 1, a pair of side walls 20 extend horizontally and are supported by frames 16 and standards 18 and another set of standards 22. The number of sets of standards 22 required will be determined by the length of the apparatus.

A platform 24 is mounted atop side walls 20 and supports a prime mover 26. The prime mover is coupled with a drive sprocket 28, a drive chain 30, and a driven sprocket 32. A bracket 34 and a cross member 36 spanning the distance between frames 16 carries a support rail 38 which extends horizontally between side walls 20. A shaft 40 is journalled in side walls 20 and rail 38, shaft 40 serving to mount driven sprocket 32 and a pair of conveyor drive sprockets 42. Additional, horizontally spaced cross members 44 span the distance between walls 20 and are employed to assure adequate support of rail 38.

A pair of endless conveyor chains 46 is trained over corresponding drive sprockets 42 and a number of idler sprockets 48. A pair of tracks 50 extends horizontally throughout substantially the entire length of the apparatus, each track 50 being rigid with a corresponding frame 16, in the loading area of the apparatus, and secured to side walls 20 in the delivery portion of the assembly. The lower stretches of chains 46 overlie tracks 50, are supported thereby, and ride thereon during driving of the conveyor chains.

An endless series of trays 52 is carried by chains 46, each tray 52 being of transversely U-shaped, open-ended configuration as is clearly illustrated in FIGS. 2 and 3. Opposed hinge pins 54 are rigid with chains 46 and extend toward one another into operative association with corresponding hinge barrels 56 rigid with trays 52. As is clearly revealed in FIG. 4, each tray 52 is provided with a pair of hinge barrels 56 adjacent the trailing extremity 58 thereof. The direction of movement of the trays during operation of the conveyor chains is illustrated by the arrow in FIG. 4; the direction of movement of the conveyor in FIG. 1 is counterclockwise, the lower stretch moving rightwardly and the upper stretch moving leftwardly.

A retainer or projection 60 is rigid with one side of each tray 52, respectively, and is disposed adjacent the trailing extremity 58 thereof and in vertically upwardly spaced relationship to the associated hinge barrel 56. The function of projection 60 will become apparent when the operation of the apparatus is discussed hereinafter. A stud or runner 62 is rigid with certain of the trays 52, respectively, and is positioned thereon adjacent the leading extremity 64 thereof on the side of the tray opposite from projection 60. Normally, the stud or runner 62 rides along the corresponding track 50 and thereby supports the tray to which it is secured.

The operation of the apparatus will now be discussed prior to describing the modified form of the invention shown in FIGS. 6 and 7. At the outset, it should be understood that the studs 62 are attached to only certain of the trays 52, such certain trays being at predetermined space intervals along the conveyor chains. A tray provided with a stud 62 will hereinafter be referred to as a master or primary tray since each of these trays is of special significance in the operation of the apparatus. The trays 52 following a given primary tray will be referred to as secondary trays, it being understood that these trays are dependent for support upon the preceding primary tray.

In FIG. 1 the trays 52 on the lower stretch of the conveyor in the left half of the figure are shown in their material-carrying dispositions, while the lower trays in the right half of the figure are illustrated in their material-dumping dispositions. The left-hand trays of the lower stretch receive livestock feed from spout 14 as the trays move horizontally past the spout. The loaded trays are thus carried by the conveyor chains to a dumping location, in this case directly over the feed trough 12.

It may be seen, especially in FIG. 4, that the primary tray 52 there shown is supported both by stud 62 and the hinge barrels 56 and hinge pins 54 associated therewith. The leading extremity 64 of the secondary tray immediately behind the primary tray, however, overlies the trailing extremity 58 of the primary tray. Thus, this secondary tray is supported by the primary tray, and succeeding trays are mutually supported in the same manner. It is, therefore, apparent that, if it were not for the presence of stud 62 on the primary tray, all of the trays would swing about their respective hinge pins and hang from the conveyor chains in the material-dumping dispositions depicted in FIG. 1. Note that another secondary tray 52, shown preceding the primary tray in FIG. 4, is illustrated in dumping disposition with the projection 60 thereof in overlying engagement with track 50. Thus, the projections 60 serve to maintain their associated trays in vertical dispositions after dumping of the contents therein and, furthermore, prevent swinging or oscillating of the trays after the dumping operation.

The dumping and distributing function of the apparatus may now be readily appreciated. In FIG. 1 it may be seen that each of the tracks 50 terminates at 66, such terminations being adjacent the right end of trough 12 and vertically spaced thereabove. As a given primary tray traverses tracks 50 and advances toward terminations 66, the primary tray and those secondary trays disposed between it and the next succeeding primary tray will be maintained in material-carrying disposition because the primary tray, through its associated stud 62, is supported by the tracks 50. However, once terminations 66 are reached, stud 62 is no longer supported and the primary tray becomes severely unbalanced, both because of its inherent weight and the weight of the material thereon. Manifestly, this causes swinging of the primary tray about its associated hinge pins as illustrated in FIG. 5. In FIG. 5 the trays are advancing leftwardly and the primary tray has just reached the terminations 66 of tracks 50. Since the trays behind the primary tray are in overlapping, mutually supporting relationship, the leading extremity 64 of each succeeding secondary tray will be momentarily lifted as illustrated in FIG. 5. However, once the primary tray moves to a slightly more vertically disposed position than that shown in FIG. 5, the leading extremity of the succeeding tray is no longer engaged by the trailing extremity of the primary tray and is free to fall to its material-dumping disposition. This continues in domino fashion back along tracks 50 until the next primary tray is reached. In FIG. 1 the row of trays overlying trough 12 is illustrated as having just completed dumping, and it may be seen that the last tray to dump is adjacent another primary tray now disposed in vertically spaced relationship to the left edge of the trough.

From the foregoing it may be appreciated that successive rows of trays will continue to dump feed into trough 12 to uniformly fill the latter with evenly distributed feed if the primary trays are spaced apart at the proper intervals. Interval spacing of the primary trays may be rendered adjustable by constructing all the trays so that any tray may receive a stud 62. Manifestly, this could be accomplished by threading the studs and fabricating each tray with a threaded socket adjacent its leading extremity for receiving a stud. In this manner, feed troughs of various lengths may be accommodated.

It is most desirable and preferred that the speed of the conveyor be slow relative to the speed at which the "dominoing" action of the trays occurs. After the dumping operation the trays traverse the right-hand end of the apparatus, as viewed in FIG. 1, and commence movement along the upper stretch of the conveyor. At this time, rail 38 serves to support the normally leading extremities 64 of the trays as the same are pulled by the conveyor chains 46 back to the loading area adjacent spout 14. In the loading area it may be seen that rail 38 is configured so that each tray will be returned to the lower stretch of the conveyor in a horizontal, material-carrying disposition in overlapping relationship to the preceding tray.

Referring to FIGS. 6 and 7, a modified form of the instant invention is shown, components common to both the modified form and the previously described form of the invention being designated by like reference characters. The modified form is provided with an additional, single track comprising track sections 68, 70 and 72. These track sections are parallel with and vertically upwardly spaced from the track 50 which, in the form of the invention previously described, was utilized to support the studs 62 of the primary trays. In the modified form, however, a stud or runner 62' is attached to each tray 52, the studs 62' being identical to studs 62 except that these studs are now spaced from the bottoms of respective trays so that the same are approximately intermediate the normal upper and lower margins of the trays. This change of location enables studs 62' to normally ride along the elevated track section 68, tracks 50 now being utilized solely to support conveyor chains 46 and their associatd tray mounting structures.

A solenoid operated switch mechanism 74 is employed to shunt a selected tray from track section 68 onto track section 70. Mechanism 74 is mounted on one of the standards 22 and includes a solenoid 76, an L-shaped switch element 78 and a crank arm 80 interconnecting switch 78 with the armature of solenoid 76. The L-shaped configuration of the switch element 78 may be seen by a comparison of FIGS. 6 and 7.

A solenoid operated gate mechanism 82 is mounted on another standard 22 horizontally spaced from mechanism 74 in the direction of advancement of the conveyor. Mechanism 82 includes a solenoid 84, a swingable gate element 86, and a crank arm 88 interconnecting gate element 86 with the armature of solenoid 84. Gate element 86 is movable between the position shown, where the continuity between track sections 70 and 72 is interrupted, and a position where element 86 forms a link between track sections 70 and 72.

In the operation of the modified arrangement, any of the trays 52 may be effectively made a primary tray by actuation of solenoid 76. Energization of solenoid 76 moves switch element 78 from its normal position as shown, to a disposition where element 78 engages track section 68 and forms a bridge between section 68 and section 70. Manifestly, if solenoid 78 is energized just before the stud 62' of a selected tray reaches switch element 78, the stud will be forced to ride up the incline presented by element 78, thereby shunting the stud onto track section 70. Immediate de-energization of solenoid 76 will then preclude additional trays from moving into supported relationship to track section 70, thereby rendering such succeeding trays secondary trays dependent on the selected primary tray for their support. The termination 90 of track section 70 causes the primary tray to move to its dumping disposition in the same manner as in the form of the invention described hereinabove.

A number of gate mechanisms 82 may be placed along the path of the conveyor in order to provide multiple dumping points. Furthermore, the number of secondary trays following a given primary tray may be varied by selective operation of switch mechanism 74. The cumulative effect of the provision of mechanisms 74 and 82, therefore, is to provide ultimate selectivity both in dumping location and in the longitudinal dimension of the dumping area.

The form of the invention illustrated in FIGS. 6 and 7 and described hereinabove readily lends itself to operation by automatic control circuitry which may be preset to operate switch mechanism 74 and a number of gate mechanisms 82 so that feed could be distributed to several feed lots. Furthermore, complete automation may be achieved through the use of a time clock control so that the various feed troughs would be automatically refilled at predetermined time intervals without operator attention.

Having thus described the invention, what is claimed as new and desired to be secured by Letters Patent is:

1. Apparatus for transporting and unloading materials comprising:
   conveyor means adapted for advancement along a predetermined path of travel;
   primary, material-receiving tray means having a pair of opposed extremities;
   means supporting one extremity of said primary tray means and mounting the latter on said conveyor means for advancement therewith and for movement of the primary tray means between a material-carrying disposition and a material-dumping disposition;
   support structure adjacent said conveyor means, extending in the direction of advancement of the conveyor means, and having a termination at a dumping location;
   means on said primary tray means in engagement with said structure, during advancement of the primary tray means toward said termination, for supporting the primary tray means and maintaining the latter in said material-carrying disposition;
   at least one secondary, material-receiving tray means having a pair of opposed extremities;
   means supporting one extremity of said secondary tray means and mounting the latter on said conveyor means for advancement therewith and for movement of the secondary tray means between a material-carrying disposition and a material-dumping disposition; and
   means on said primary tray means adjacent said one extremity thereof and engageable with the other extremity of said secondary tray means, when the primary tray means is in its material-carrying disposition, for supporting the secondary tray means and maintaining the latter in its material-carrying disposition, whereby, when the primary tray means reaches said termination, only the one extremity of both tray means remains supported permitting movement of both to their material-dumping dispositions.

2. The invention of claim 1, wherein said means on the primary tray means engageable with said structure is disposed adjacent the other extremity of said primary tray means.

3. The invention of claim 1, wherein each mounting means supports the corresponding tray means for gravitational movement from said material-carrying disposition to said material-dumping disposition thereof.

4. The invention of claim 1, wherein said means on the primary tray means adjacent the one extremity thereof comprises a portion of said primary tray means movable therewith from a position in underlying relationship to said other extremity of the secondary tray means to a position clearing the secondary tray means during movement of the primary tray means from its material-carrying disposition to the material-dumping disposition thereof.

5. The invention of claim 1, wherein said support structure comprises track means, said means on the primary tray means for maintaing the latter in said material-carrying disposition comprising a runner engageable with said track means.

6. The invention of claim 5, wherein said runner is disposed adjacent the other extremity of said primary tray means.

7. The invention of claim 6, wherein each mounting means supports the corresponding tray means for gravitational movement from said material-carrying disposition to said material-dumping disposition thereof, said means on the primary tray means adjacent the one extremity thereof comprising a portion of said primary tray means movable therewith from a position in underlying relationship to said other extremity of the secondary tray means to a position clearing the secondary tray means during movement of the primary tray means from its material-carrying disposition to the material-dumping disposition thereof.

8. Apparatus for transporting and unloading materials comprising:
   endless conveyor means adapted for advancement along a predetermined path of travel;
   a series of material-receiving tray structures each having and opposed, leading and trailing extremities;
   means supporting the trailing extremity of each of said tray structures and mounting the latter on said conveyor means for advancement therewith and for movement of each tray structure between a material-carrying disposition and a material-dumping disposition;
   track means adjacent said conveyor means and extending generally parallel to said path of travel;
   a runner on each of at least certain of said tray structures, respectively, disposed adjacent the leading extremity thereof and engageable with said track means during advancement of the conveyor means for supporting a corresponding tray structure and maintaining the latter in said material-carrying dispoistion;
   means on each of said tray structures respectively adjacent said trailing extremity thereof and engageable with the leading extremity of the following tray strucrial-carrying disposition, for supporting said following tray structure and maintaing the same in its material-carrying disposition;
   means operably coupled with said track means for engaging the runner of a selected one of said certain tray structures to shunt said runner onto said track means during advancement of said selected tray structure; and
   means interposed in said track means at a dumping location for interrupting the track means, whereby when the runner of the selected tray structure reaches the interruption in the track means, only the trailing extremity of said selected tray structure remains supported permitting movement of the latter and the mutually supported tray structures therebehind to their material-dumping dispositions.

9. The invention of claim 8, wherein said mounting means supports the tray structures for gravitational movement from said material-carrying dispositions to said material-dumping dispositions.

10. The invention of claim 8, wherein each means on a respective tray structure adjacent the trailing extremity thereof comprises a portion of the respective tray structure movable therewith from a position in underlying relationship to the leading extremity of the following tray structure to a position clearing the latter during movement of said respective tray structure from its material-carrying disposition to the material-dumping disposition thereof.

11. Apparatus for transporting and unloading materials comprising:
   endless conveyor means adapted for advancement along a predetermined path of travel;
   a series of material-receiving tray structures each having and opposed, leading and trailing extremities;
   means supporting the trailing extremity of each of said tray structures and mounting the latter on said conveyor means for advancement therewith and for movement of each tray structure between a material-carrying disposition and a material-dumping disposition;
   track means adjacent said conveyor means and extending in the direction of advancement of said conveyor means, and having a termination at a dumping location;
   a runner on each of at least certain of said tray structures, respectively, disposed adjacent the leading extremity thereof and engageable with said track means during advancement of the conveyor means for supporting a corresponding tray structure and maintaining the latter in said material-carrying disposition;

means on each of said tray structures respectively adjacent said trailing extremity thereof and engageable with the leading extremity of the following tray structure, when the preceding tray structure is in its material-carrying disposition, for supporting said following tray structure and maintaining the same in its material-carrying disposition; and means operably coupled with said track means for engaging the runner of a selected one of said certain tray structures to shunt said runner onto said track means during advancement of said selected tray structure, whereby when the runner of the selected tray structure reaches said termination, only the trailing extremity of said selected tray structure remains supported permitting movement of the latter and the mutually supported tray structures therebehind to their material-dumping dispositions.

12. Apparatus for transporting and unloading materials comprising:

conveyor means adapted for advancement along a predetermined path of travel;

a row of material-receiving tray structures each having opposed, loading and trailing extremities;

means supporting the trailing extremity of each of said tray structures and mounting the latter on said conveyor means for forward advancement therewith and for movement of each tray structure between a material-carrying disposition and a material-dumping disposition;

track means adjacent said conveyor means and extending generally parallel to said path of travel;

a runner on the forwardmost tray structure of said row disposed adjacent the leading extremity thereof and in engagement with said track means during advancement of the conveyor means for supporting said forwardmost tray structure and maintaining the latter in said material-carrying disposition;

means adjacent the trailing extremity of the more forward tray structure of each pair of adjacent tray structures, respectively, and engageable with the leading extremity of the following tray structure, when the more forward tray structure is in its material-carrying disposition, for supporting said following tray structure and maintaining the same in its material-carrying dispostion; and means interposed in said track means at a dumping location for interrupting the track means, whereby, when the runner on the forwardmost tray structure reaches the interruption in the track means, only the trailing extremity of said forwardmost tray structure remains supported permitting movement of the latter and the mutually supported tray structures therebehind to their material-dumping dispositions.

References Cited by the Examiner
UNITED STATES PATENTS

| | | | |
|---|---|---|---|
| 880,091 | 2/1908 | Paton | 198—146 X |
| 1,768,534 | 7/1930 | Aiken | 198—145 X |
| 2,615,424 | 10/1952 | Spickler | 198—145 X |
| 2,621,775 | 12/1952 | Smith | 198—38 |

SAMUEL F. COLEMAN, *Primary Examiner.*